Patented Sept. 18, 1945

2,385,106

UNITED STATES PATENT OFFICE 2,385,106

LONG CHAIN ALKYL SUBSTITUTED 4-AMINO-1,8-NAPHTHALIC ACID IMIDES

Mario Scalera, Somerville, and Asa Willard Joyce, Plainfield, N. J., assignors to American Cyanamid Company, New York, N. Y., a corporation of Maine No Drawing. Application September 5, 1942, Serial No. 457,517

5 Claims. (Cl. 260—281)

This invention relates to new oil-soluble yellow dyes derived from 4-amino-1,8-naphthalic acid imides.

It has been proposed to prepare derivatives of 4-amino-1,8-naphthalic acid in which both nitrogen atoms are replaced by the same alkyl radical.

According to the present invention we have found that, in order to obtain high solubility in mineral oil, combined with high fluorescent strength, it is important to have a single long chain alkyl radical in the molecule.

If dyes are prepared in which the 4-amino group is substituted by an aliphatic hydrocarbon of at least 12 carbon atoms, while the imide group is substituted by an alkyl radical of less than 6 carbon atoms, high oil solubility is obtained and it is possible to use these dyes to impart to lubricating oil a fluorescence. The new dyes fluoresce very strongly and when dissolved in lubricating oils improve their appearance. The dyes are also useful in coloring plastics which are to fluoresce under ultraviolet light.

The dyes of the present invention may be represented by the following formula:

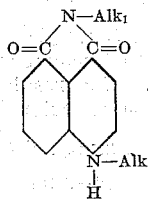

in which one of the groups, Alk and Alk₁, is an aliphatic hydrocarbon radical having at least 12 carbon atoms and the other lower alkyl group having less than 6 carbon atoms.

The compounds of the present invention are not limited to any particular method of preparation, but we prefer to produce them by a two step process in which a 4-bromo or 4-chloro-1,8-naphthalic anhydride is first condensed with the desired aliphatic amine under conditions such that the amine reacts only with the anhydride group. It is not difficult to limit the reaction of the amine to the anhydride group as this group is much more reactive than is the halogen, and if an approximately theoretical amount of amine is brought into the reaction, preferably in an inert diluent, only the anhydride groups react. The resulting product can then be reacted with the other primary alkylamine, the reaction being preferably carried out in the presence of a cupriferous catalyst and a substance capable of acting as an acid binder for the hydrogen halide formed in the reaction. Both steps may be advantageously carried out in the same inert diluent and it is not necessary to first isolate the 4-halogen naphthalic imide. It is sufficient after the first reaction is completed to add the second amine, the proper catalyst, and the acid binding substance.

The temperature in the first step is not critical and can be maintained at a moderate temperature, preferably below 150° C., but the second step is more easily carried out at higher temperatures, for example 150–225° C. and can be carried out at atmospheric pressure if the second amine is the long chain one. These are the preferred products.

Either the 4-bromnaphthalic anhydride or the 4-chlornaphthalic anhydride may be used, but as the bromo compound is considerably more active, it is preferred.

The nature of the cupriferous catalyst and acid binding substance is not critical and the common cupriferous catalysts such as copper powder, cupric chloride, cuprous chloride, cuprous iodide or mixtures of copper powder and iodine may be used. Alkali metal carbonates or acetates form very effective acid binding agents and are preferred although any other suitable acid binding agent may be used.

The new compounds are yellow dyestuffs, very soluble in paraffin hydrocarbons and in many organic plastics and capable of producing greenish-yellow colors by reflected light and yellow colors by transmitted light. They all fluoresce a very intense green when exposed to ultraviolet radiation. The high solubility in aliphatic hydrocarbons renders the dyes very useful for dyeing gasoline or lubricating oil. They may also be used in dyeing a wide range of plastics such as methacrylates, polystyrenes, nitrocellulose, cellulose acetate and the like and are suitable for producing colored plastic articles which are to be used under circumstances where fluorescence is desirable such as for example in black-outs, in motion picture theaters and the like. Another field of use is in the dyeing of wax, particularly for candles, beautiful canary yellow shades being obtainable which fluoresce yellow and yellow-green under ultraviolet light.

The invention will be illustrated in greater detail in conjunction with the following typical examples. The parts are by weight.

Example 1

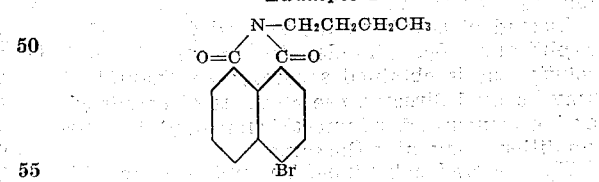

55.4 parts 4-bromo-1,8-naphthalic anhydride (M. P. 218–9° C.) is introduced into 455 parts o-dichlorobenzene, the mixture is stirred and heated to 135–40° C. 16.0 parts n-butylamine is now added gradually over the course of 2 hours. After heating an hour longer water and excess butylamine are removed by gradually raising the temperature of the reaction mixture to 160–65° C. The charge is cooled to 100° C. and 2.0 parts sodium carbonate are added, whereupon the mixture is steamed to remove dichlorobenzene. On cooling, the crude 4-bromo-1,8-naphthalic N-butylimide crystallizes as a pale yellow substance, which after recrystallization from alcohol shows the melting point of 104–105° C.

*Example 2*

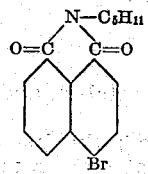

100 parts 4-bromo-1,8-naphthalic anhydride (M. P. 218-9° C.) is introduced into 260 parts o-dichlorobenzene, the charge is stirred and heated to 135–40° C. Then 40 parts commercial amylamine are added gradually during the course of 2 hours, water and excess amylamine refluxing. After heating for 2–3 hours longer at 135–40° C. the water and excess amylamine are removed by distilling and raising the temperature of the reaction mixture to 160–65° C. On cooling to room temperature there is no separation of the reaction product. To isolate it o-dichlorobenzene is removed by steaming. A viscous yellow liquid remains which solidifies on cooling. The yield is nearly theoretical. On recrystallization from alcohol the 4-bromo-1,8-naphthalic N-amylamide is obtained in pale yellow crystals melting at 73–75° C.

*Example 3*

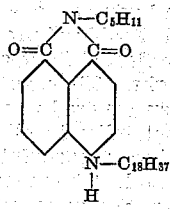

125 parts 4-bromo-1,8-naphthalic-N-amylimide, 100 parts octadecylamine, 2.25 parts copper powder and 21.2 parts sodium carbonate are introduced into 260 parts o-dichlorobenzene. The mixture is stirred and heated to a temperature of 165–70° C. for 15 hours. The deep yellow reaction mixture is cooled to 90–100° C. and filtered from insoluble inorganic matter which may be washed with a further quantity of dichlorobenzene. The filtrate is now steamed to remove solvent and a dark brownish-yellow thick oil, insoluble in water, remains. On cooling this forms a soft waxy mass, from which the accompanying water may be separated. Yield of crude product is approximately theoretical.

Instead of starting wiht isolated 4-bromo-1,8-naphthalic N-amylimide, the dichlorobenzene solution as is obtained according to Example 2, may be used directly, the amounts of octadecylamine, copper and sodium carbonate and the other conditions remaining the same.

The 4-octadecylamino-1,8-naphthalic acid-N-amylimide is readily soluble in cold hexane, and in higher paraffin hydrocarbons such as mineral oil. It is also soluble in cold benzene, carbon tetrachloride, acetone, and alcohol. A 50% solution in mineral oil does not crystallize.

Very dilute solutions (1:10,000–1:30,000) in mineral oil exhibit a bright greenish fluorescence. More concentrated solutions are yellow by transmitted light.

*Example 4*

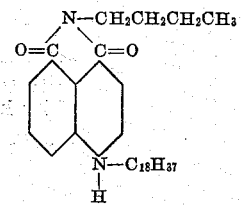

The procedure of Example 3 is followed except that instead of the 4-bromo-1,8-N-amylnaphthalimide, the corresponding n-butyl compound is used. A dyestuff is produced in good yields and has substantially the same properties as those of the product of Example 3.

*Example 5*

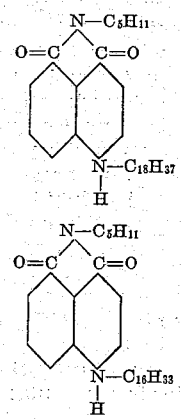

The procedure of Example 3 was followed but a technical mixture of hexadecyl and octadecylamine is employed. The resulting product is of substantially the same color and properties.

*Example 6*

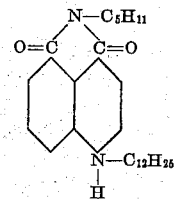

12.7 parts 4-bromo-1,8-naphthalic-N-amylimide, 7.4 parts dodecylamine (95%), 2.1 parts dry soda ash, 0.22 parts copper powder and 0.22 parts iodine crystals are introduced into 32.5 parts o-dichlorobenzene and the mixture is stirred and heated to a temperature of 165°–70° C. for 10 hours. After cooling to 90–100° C. the reaction mixture is filtered to remove insoluble metallic compounds, and then steamed to remove o-dichlorobenzene. The residual oil, insoluble in water is yellow, and forms a semi-solid waxy mass on cooling. It is readily soluble in toluene, carbon tetrachloride, acetone, alcohol, benzene, somewhat less soluble in paraffin hydrocarbons. The 4-dodecylamino-1,8-naphthalic-N-amylimide separates from hexane in beautiful greenish-yellow crystals, melting at 90–92 C. exhibiting an intense yellowish-green fluorescence in solid form. Its dilute solutions in organic solvents also exhibit an intense fluorescence.

Example 7

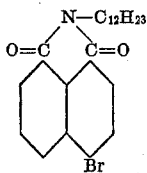

8.3 parts 4-bromo-1,8-naphthalic anhydride and 6.0 parts dodecylamine (95%) are introduced into 24 parts monochlorobenzene. The mixture is stirred and heated to reflux temperature (117–120° C.) for 5 hours. The solvent is removed by steaming, and on cooling a soft waxy mass, insoluble in water, is obtained. Recrystallized from acetone, the 4-bromo-1,8-naphthalic-N-dodecylimide shows a M. P. of 55–58° C. and is a white crystalline substance soluble in benzene, alcohol and acetone.

Example 8

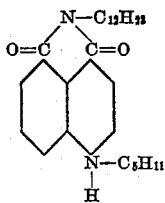

10.3 parts 4-bromo-1,8-naphthalic-N-dodecylimide, 5.2 parts amylamine (technical), 0.16 part copper powder and 0.16 part iodine crystals are introduced into 32 parts o-dichlorobenzene. The mixture is stirred and heated under reflux condenser at 135–40° C. for 8 hours. The reaction mixture is then steam distilled and after cooling extracted with cold hexane, which solvent is removed by evaporation. The reaction product, 4-amylamino-1,8-naphthalic acid-N-dodecylimide, is obtained as a viscous yellow liquid exhibiting a strong greenish fluorescence in hydrocarbon solvents.

We claim:

1. New compounds of the formula:

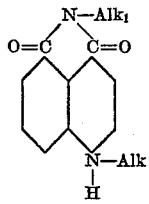

in which one of the groups, Alk and Alk$_1$, is an aliphatic hydrocarbon radical having at least 12 carbon atoms and the other is an alkyl radical having less than 6 carbon atoms.

2. New compounds of the formula:

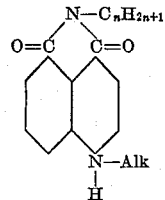

in which Alk is an aliphatic hydrocarbon radical having at least 12 carbon atoms and $n$ is a whole number less than 6.

3. A 4-octadecylamino-1,8-naphthalic acid-N-amyl imide having the following formula:

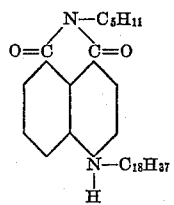

4. A 4-hexadecylamino-1,8-naphthalic acid-N-amyl imide having the following formula:

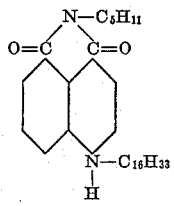

5. A 4-octadecylamino-1,8-naphthalic acid-N-butylimide having the following formula:

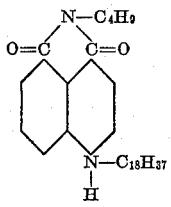

M. SCALERA.
ASA WILLARD JOYCE.